United States Patent
Mazzotti et al.

(10) Patent No.: US 6,402,241 B1
(45) Date of Patent: Jun. 11, 2002

(54) CHILD'S SAFETY SEAT

(76) Inventors: Peter Charles Mazzotti, Rake House, Crossways Road, Grayshott, Surrey, GU26 6HE; Stefan Olszowski, East Hoe Manor, Hambledon, Portsmouth, Hampshire, PO7 6S2, both of (GB)

( * ) Notice: Subject to any disclaimer, the term of this patent is extended or adjusted under 35 U.S.C. 154(b) by 45 days.

(21) Appl. No.: 09/583,625

(22) Filed: May 31, 2000

(30) Foreign Application Priority Data

Jun. 2, 1999 (GB) .............................................. 9912756

(51) Int. Cl.$^7$ ................................................ B60N 2/28
(52) U.S. Cl. ........................ 297/256.16; 297/250.1; 297/245; 297/216.11
(58) Field of Search ........................... 297/216.11, 245, 297/256.16, 250.1

(56) References Cited

U.S. PATENT DOCUMENTS

| | | | | |
|---|---|---|---|---|
| 741,077 A | * | 10/1903 | Smith | 297/236 |
| 1,965,048 A | * | 7/1934 | Morris | 297/238 |
| 3,992,040 A | * | 11/1976 | Gannac | 297/465 |
| 4,674,800 A | * | 6/1987 | Ensign | 297/465 |
| 4,762,256 A | * | 8/1988 | Whitaker | 224/161 |
| 4,976,494 A | * | 12/1990 | Polley | 297/464 |
| 5,118,163 A | * | 6/1992 | Brittian et al. | 297/250 |
| 5,219,203 A | * | 6/1993 | Switlik | 297/216.11 |
| 5,265,828 A | * | 11/1993 | Bennington | 244/122 |
| 5,409,293 A | * | 4/1995 | Nagasaka | 297/236 |
| 5,673,969 A | * | 10/1997 | Frazier | 297/256.15 |
| 5,941,600 A | * | 8/1999 | Mar et al. | 297/250.1 |

FOREIGN PATENT DOCUMENTS

JP 10-157564 A * 6/1998

* cited by examiner

*Primary Examiner*—Peter M. Cuomo
*Assistant Examiner*—Joseph Edell
(74) *Attorney, Agent, or Firm*—Ware, Fressola, Van Der Sluys & Adolphson LLP

(57) ABSTRACT

A child's safety seat for use with a forwards facing adult seat in an aircraft has a framework for supporting a child facing backwards, towards the adult seat, above the floor with the framework supported on the floor in front of the adult seat. A fabric pouch for holding the child is supported on the framework and has a back, a bottom, a front and two leg openings. A strap is provided for securing the fabric pouch to the adult restraint of the adult seat. A hook arrangement is provided for securing the framework of the child's safety seat to the frame of the adult seat. Thus a child can be restrained in the safety seat facing a restrained occupant of the adult seat.

17 Claims, 4 Drawing Sheets

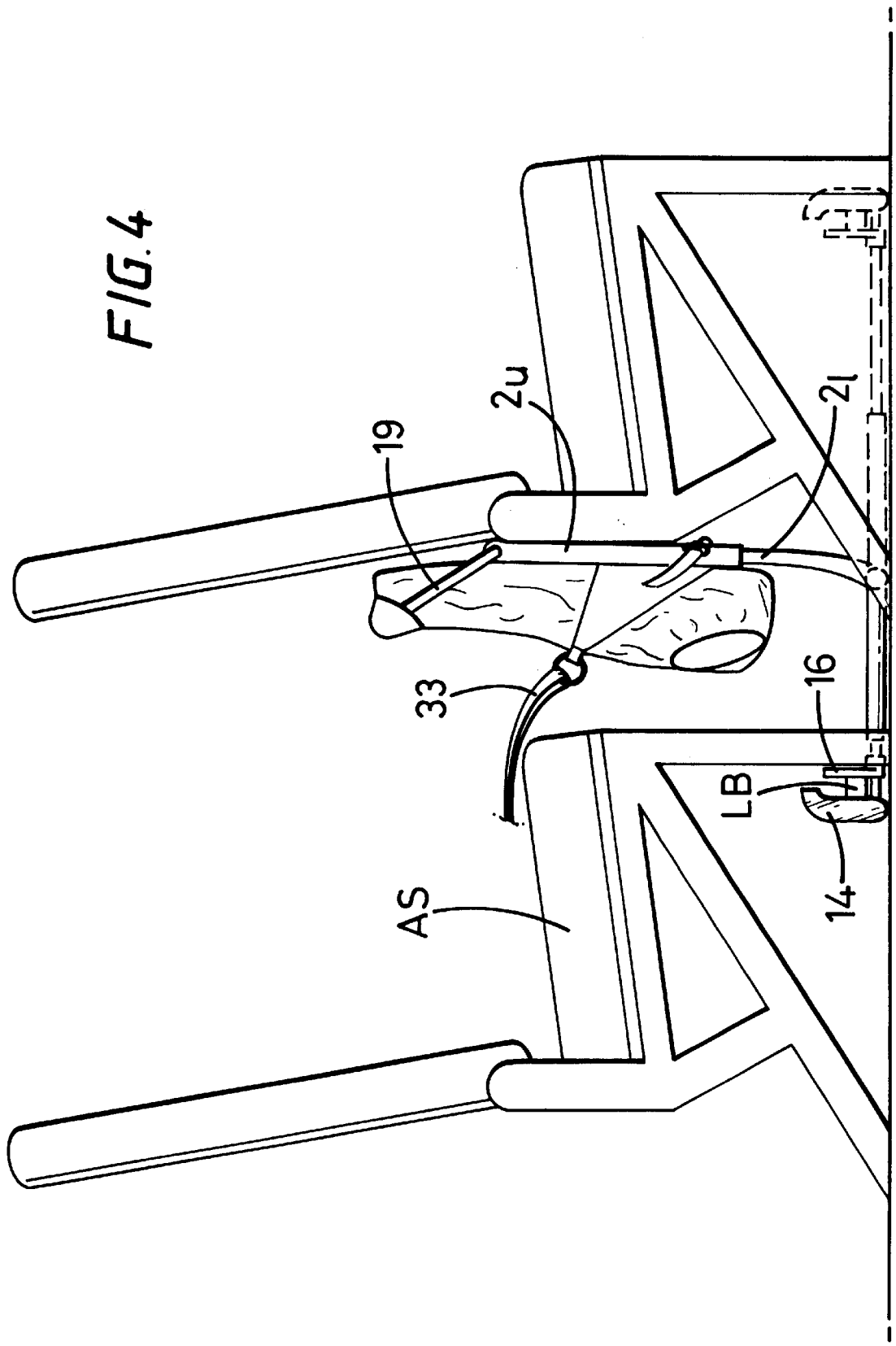

CHILD'S SAFETY SEAT

The present invention relates to a child's safety seat for use in a vehicle, particularly though not exclusively for use in aircraft.

TECHNICAL FIELD

Background of the Invention

In our British Patent No. 2,279,559, we proposed a child's safety seat for use in aircraft, which comprises a frame and seat cushion(s) adapted to be placed and strapped to an adult seat, but facing backwards or possibly forwards with respect to the adult seat. Whilst this safety seat provides satisfactory emergency restraint, it has the economic disadvantage of occupying an ordinary adult seat which might be otherwise occupied by another adult. Further, the safety seat is relatively bulky posing difficulties in storage onboard the aircraft when not in use.

The object of the invention is to provide an improved child's safety seat.

SUMMARY OF THE INVENTION

According to the invention there is provided a child's safety seat for use with an adult seat having an adult restraint and mounted to face forwards on the floor of a vehicle, the child's safety seat comprising:
- a framework for supporting a child facing backwards, towards the adult seat, above the floor with the framework supported on the floor in front of the adult seat;
- a fabric pouch for holding the child,
  - the pouch having a back, a bottom, a front and two leg openings and
  - the pouch being adapted to be supported on the framework;
- a means for securing the fabric pouch to the adult restraint of the adult seat; and
- means for securing the framework of the child's safety seat to the frame of the adult seat and/or the frame of a next adult seat in front, the arrangement being such that a child can be restrained in the safety seat facing a restrained occupant of the adult seat.

In one embodiment, the framework has a central upright member, which is wide in comparison with its thickness so as to provide distributed support to the child's back when pressed against it in an emergency. Alternatively the framework can have a pair of upright members, arranged at its edges with the pouch extending therebetween. This alternative enables the seat to be adapted with straps to be a backpack child carrier. The upright member(s) can be telescopic for adapting the framework to use in a particular aeroplane, vehicle etc. Further, the framework is conveniently foldable for stowage in a small locker or the like.

Normally the framework will have a top spreader member extending to either side of the central upright member or between the two upright side members as the case may be, to provide a laterally spaced pair of upper supports for the pouch. Similarly, the framework will have a bottom spreader member. The pouch may be connected to remote ends of this, although in one embodiment, the pouch has a lower connection to the central upright member. The bottom spreader member provides lateral stability with respect to the floor.

The fabric pouch is substantially similar to that of a back-pack child carrier. It will normally extend up to a child's head height, to support the head in an emergency. The adaptation for supporting the pouch on the framework are preferably releasable, whereby the child and the pouch can be lifted from the framework in an emergency. For this, the pouch is conveniently provided with a carrying handle. The fabric pouch may be of differing sizes to suit differing sizes of child and yet fit a common framework.

The means for securing the pouch to an adult restraint, normally a lap belt, is conveniently a strap stitched to the pouch at the child' mid-back height in the pouch.

The means of securing the framework to the frame of the adult seat can comprise one or more straps from the upright (s) and/or bottom member of the frame to the frame of the adult seat, and in particular to a baggage restraint bar thereof. Alternatively, for ease of connection of the framework to the bottom bar, the former may have a rearwards extending limb having a hook for hooking on the bottom bar. The limb may be T-shaped, with a pair of hooks at the distal ends of the short arms of the T, whereby the general plane of the pouch supporting portion of the framework is guided to be parallel with the luggage bar. The rearwards extending limb is preferably of adjustable length.

In use, the child's safety seat is set up on the floor in front of the adult seat, facing back, whereby the child is supported facing his/her mother or other adult in the seat. In an aircraft, the frame will normally be adjusted to closely follow the back of the adult seat in front. Thus the child is supported close to the floor, in full view of the mother and in a position which is relatively safe from loose objects in an emergency.

Emergencies can be of two types. The most acute is an emergency landing, when the child should be supported by the framework. However, turbulence emergencies do not require such a high degree of restraint. The child can then be removed from the framework, whilst still within the pouch. Strapping of the pouch to the mother's lap belt provides restraint against the child being thrown from the mother's arms in turbulence.

According to a second aspect of the invention there is a fabric pouch of the first aspect, the pouch comprising:
- a back, a bottom, a front and two leg openings;
- adaptation to be supported on the framework; and
- means for securing the fabric pouch to the adult restraint of the adult seat.

BRIEF DESCRIPTION OF THE DRAWINGS

To help understanding of the invention, a specific embodiment thereof will now be described with reference to the accompanying drawings, in which:

FIG. 4 is a diagrammatic side view of the child's safety seat installed in its use position.

DETAILED DESCRIPTION

Figure 1:
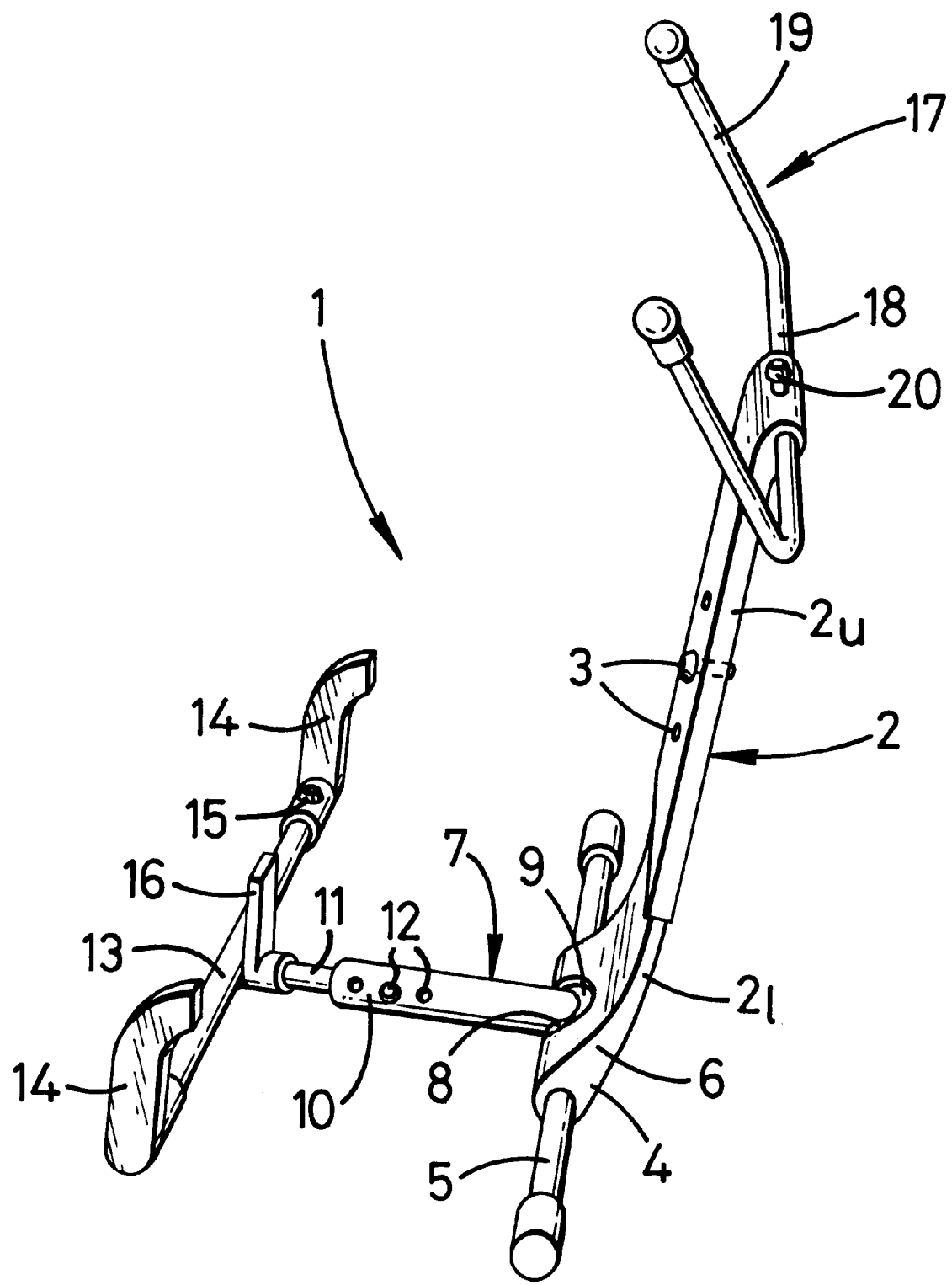
FIG. 1 is a perspective view of a framework for a child's safety seat in accordance with the invention.

Referring now to the drawings, the framework 1 of the seat has a telescopic central upright member 2 having a lower part $2_l$ and an upper part $2_u$ which fits over the lower part. The central upright member is broad (and thin) to give distributed support to a child's back pressed against it. A pin and socket arrangement 3 allows the member's length to be set to suit a particular aircraft and size of child. The lower part has a foot 4, through which a bottom spreader member 5 is fitted. The foot has a clevis 6. Also mounted on the bottom spreader is a T-piece 7, which projects from the clevis. Frictional plates 8—or the like mechanism—arranged in the clevis between a head 9 of the T and the foot 4 act to allow pivotal movement of the T-piece and the upright member 1 when a certain torque is exceeded. Otherwise, the frictional plates maintain the angle between the T-piece 7 and the central upright member 2 to which they have been adjustably set.

Telescopically arranged in the stem 10 of the T is a rod 11, securable at a desired length by another pin and socket arrangement 12. The rod 11 is itself the stem of another T, having a head 13. Frictionally pivoted to the distal ends of the head are a pair of hooks 14, with a pin and slot arrangement 15 restricting their rotation anti-clockwise in the view of FIG. 1 beyond the position they are shown in. The arrangement permits them to be pivoted horizontally, that is parallel with the rod 11. Also frictionally pivoted on the rod against the head 13 is a retainer 16, which can be turned up to its FIG. 1 position or leant down to lie parallel with the head 13.

At the upper end of the upright member, a wide U-shaped spreader 17, having its central limb 18 pivotally connected to the upper part 3 parallel to the bottom spreader 5. It has arms 19, whose generally upright position can be set by a locking pin 20.

It will be appreciated that the framework shown in FIG. 1 is in its position erected for use. The arms 19 can be pivoted down, the upright member collapsed and pivoted down, the hooks 14 and the retainer 16 pivoted down and the rod 11 collapsed in. In this position, the framework is virtually flat and can be stowed in an aircraft in a small space.

Figure 2:
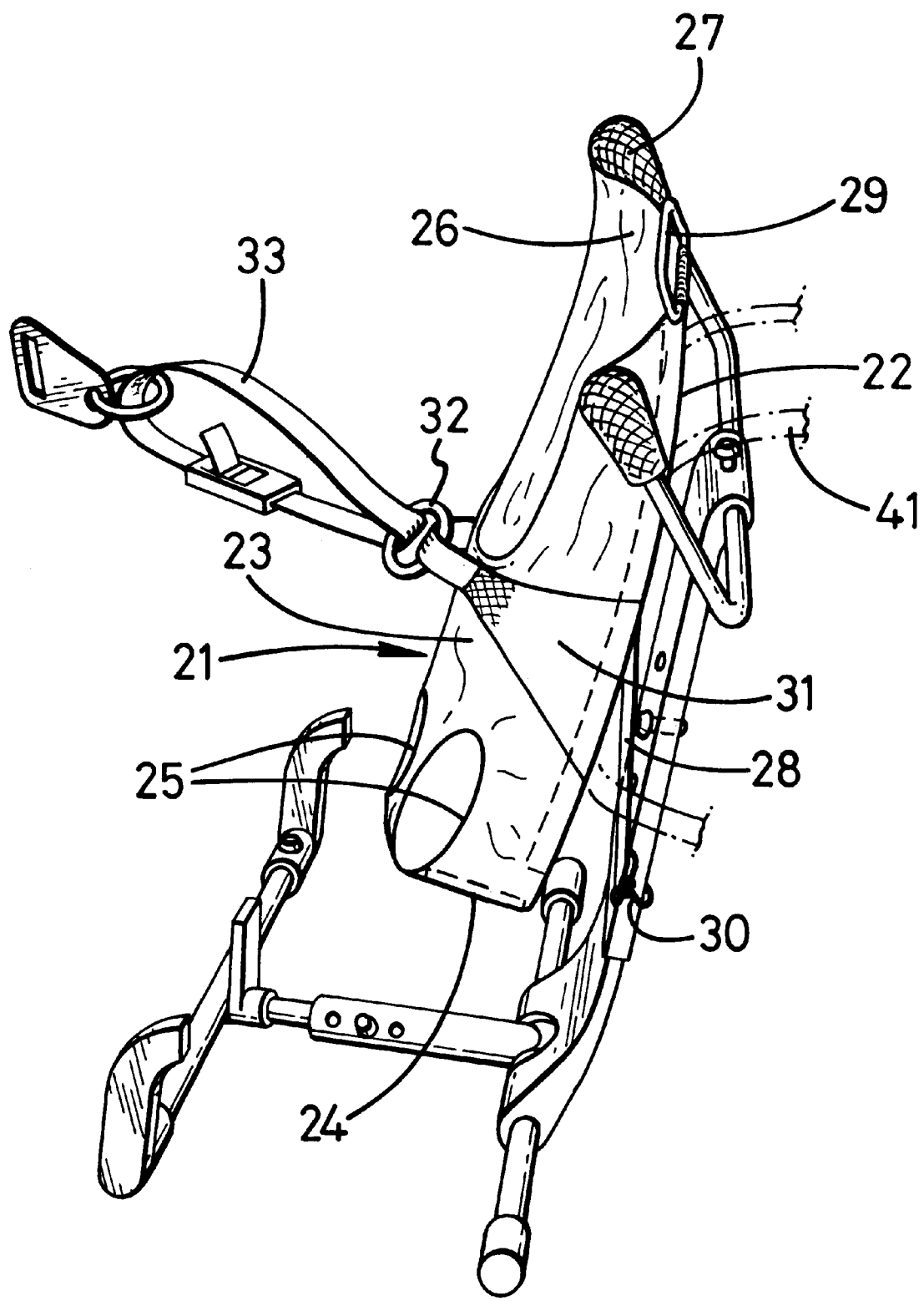
FIG. 2 is a view similar to FIG. 1 of the seat with a fabric pouch of the seat attached to the framework.
Figure 3:
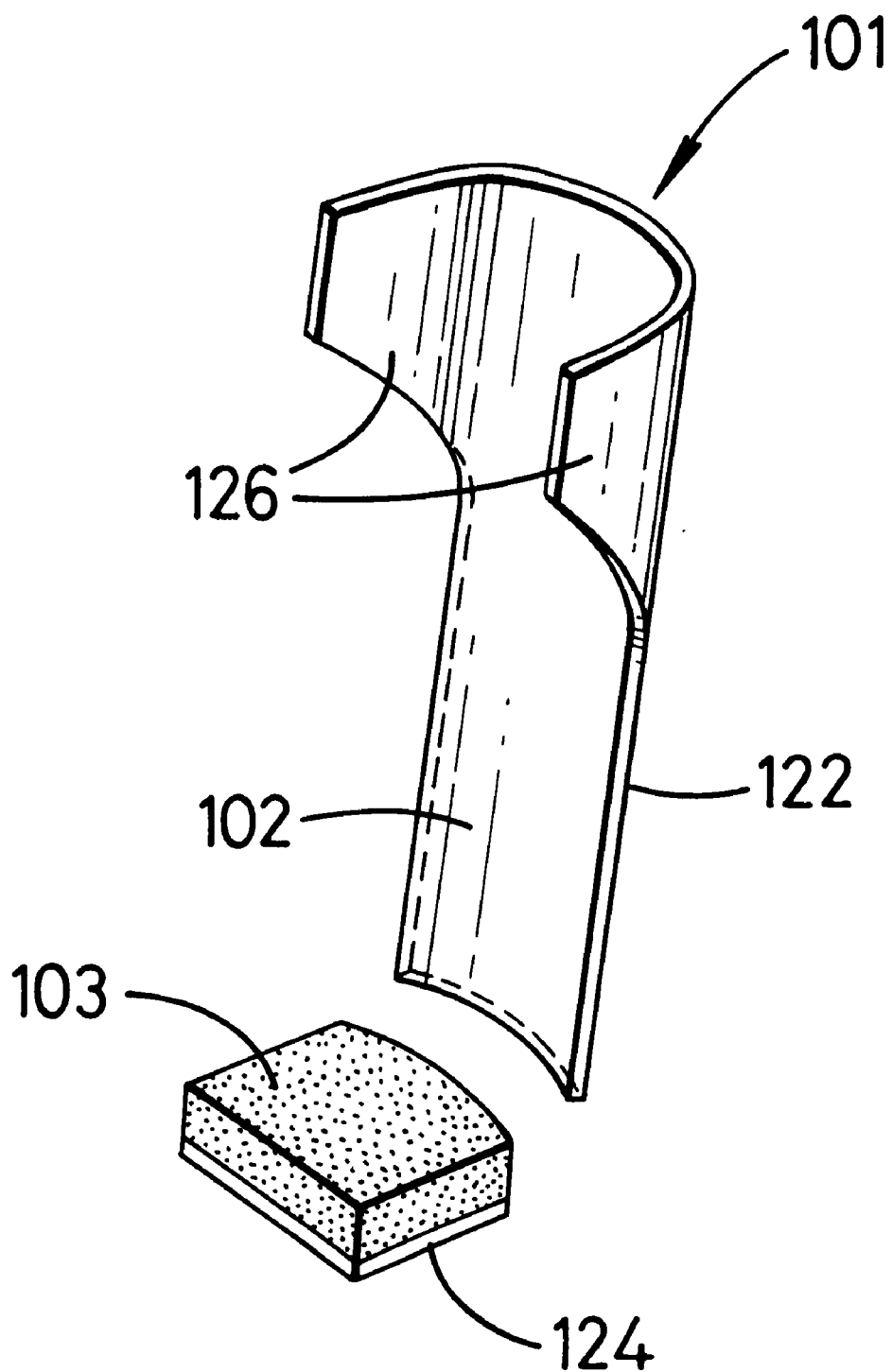
FIG. 3 is a similar view to FIG. 2 showing reinforcement only for the fabric pouch.

FIG. 2 shows a fabric pouch 21 connected to the framework. It is similar to a back-pack baby carrier in having a back 22, a front 23, a seat 24 between the back and the front, a pair of leg openings 25 in the front above the seat. At its top, the back has forwards directed wings 26 having pockets 27 for receiving the distal ends of the arms 19, to carry the bulk of the weight of the child in the pouch. The pouch is constructed of a two skins of fabric, with an internal reinforcement 101 of rigid plastics material sheet, see FIG. 3. The reinforcement has a back 122, which is slightly curved in horizontal cross-section (in use orientation) and a pair of wings 126 at head level. The back has padding 102 facing forwards. A separate sheet 124 reinforces the seat 24. It has thicker padding 103 for the child to sit on.

A strap 28 passing around the upright member above the level of the seat provides additional lateral stability of the pouch on its framework. The top of the back has a carrying handle 29 and the strap 28 has a hook-and-loop fastening 30. Thus in an emergency the carrying handle can be grasped to lift the pouch and child and burst the fastening for evacuation of the aircraft. In the region of the child's mid-back, the pouch has reinforcement 31, which is carried around to the front, where a loop 32 is attached. An auxiliary strap 33 passes through the loop and is attachable to the lap belt of an adult seat in front of which the child's seat is attachable facing backwards.

FIG. 4 shows the assembled position of the safety chair. The hooks 14 are engaged behind the luggage bar LB of the adult seat AS in which the child's mother will be sitting. The retainer 16 is turned up in front of the luggage bar to secure the safety seat. The two T-pieces are telescopically adjusted to bring the upright member 2 into close alignment with the back of the seat in front. The upright member itself is adjusted in length to suit the child. The pouch is supported on and secured to the framework by the pockets 27 and the strap 28.

In use, when the "safety belts" sign in the aircraft is illuminated during normal flight, the mother fastens the auxiliary belt to her lap belt by the auxiliary strap 33, but the pouch can be removed from the framework. The strapping of the child guards against him/her being thrown around the cabin in the case of turbulence. During take-off and landing, the pouch is returned to the framework, where the child is securely held against the back of the seat in front of his/her mother and strapped to her lap belt.

The invention is not intended to be restricted to the details of the above described embodiment. As described, the above embodiment of our child's safety seat is particularly suitable for use in aircraft. However, it is suitable for use in other vehicles such as ferries, coaches and indeed cars. For use in certain vehicles, such as cars, minor design changes are anticipated to be required within the scope of the invention. Further, the Tee piece 7, including the hooks 14 and the retainer 16 may be arrangeable to extend forwards to hook onto the baggage restraint bar of the adult seat in front of the child's seat, as shown in outline in FIG. 4. Additionally the porch may optionally be provided carrying straps 41, shown in outline in FIG. 2.

What is claimed is:

1. A child's safety seat for use with an adult seat having an adult restraint and mounted to face forwards on the floor of a vehicle, the child's safety seat comprising:
   a framework for supporting a child facing backwards, towards the adult seat, above the floor with the framework supported on the floor in front of the adult seat;
   a fabric pouch for holding the child,
      the pouch having a back, a bottom, a front and two leg openings and
      the pouch being adapted to releasably suspend from the framework;
   means for securing the fabric pouch to the adult restraint of the adult seat; and
   means for securing the framework of the child's safety seat only to the frame of the adult seat and/or the frame of a next adult seat in front, the arrangement being such that a child can be restrained in the safety seat facing a restrained occupant of the adult seat.

2. A child's safety seat according to claim 1, wherein the framework has a central upright member, which is wide in comparison with its thickness so as to provide distributed support to the child's back when pressed against it in an emergency.

3. A child's safety seat according to claim 1, wherein at least one upright member is telescopic for adapting the framework to use in a particular vehicle.

4. A child's safety seat according to claim 1, wherein the framework is foldable for stowage.

5. A child's safety seat according to claim 1, wherein the framework has a top spreader member extending to either side of a central upright member or between two upright side members, as the case may be, to provide a laterally spaced pair of upper supports for the pouch.

6. A child's safety seat according to claim 5, wherein the framework has a bottom spreader member for providing lateral stability with respect to the floor.

7. A child's safety seat according to claim 1, the pouch being provided with a carrying handle.

8. A child's safety seat according to claim 1, wherein the fabric pouch is one of a plurality of differing sizes to suit differing sizes of child and yet fit a common framework.

9. A child's safety seat according to claim 1, wherein the means for securing the pouch to an adult restraint is a strap stitched to the pouch at the child's mid-back height in the pouch.

10. A child's safety seat as claimed in claim 1, including internal reinforcement of the pouch at least at its back.

11. A child's safety seat according to claim 1, wherein the means of securing the framework to the frame of the adult seat comprises one or more straps from at least one member of the framework to the frame of the adult seat.

12. A child's safety seat according to claim 1, wherein the means of securing the framework to the frame of the adult seat comprises a floor level limb having a hook for hooking onto a baggage restraint bar of the adult seat or the frame of a next adult seat in front, the limb extending backwards to the baggage restraint bar of the adult seat faced by the child's seat or forwards to baggage restraint bar of the seat in front.

13. A child's safety according to claim 12, wherein the floor level limb is T-shaped, with a pair of hooks at the distal ends of the short arms of the T, whereby the general plane of the pouch supporting portion of the framework is guided to be parallel with the baggage bar.

14. A child's safety seat according to claim 13, wherein the floor level limb is of adjustable length.

15. A child's safety seat according to claim 12, wherein the hook comprises:

a pair of individual hooks pivotally arranged for pivoting about an axis transverse to the limb between a position parallel to the limb and an upstanding position in which they can engage behind the baggage restraint bar and a retainer pivoted about an axis parallel to the limb between a position parallel to the floor and an upstanding position for engaging the baggage restraint bar on its side opposite from that on which the individual hooks engage.

16. A child's safety seat according to claim 12, including means for adjusting the relative inclination of the floor level limb and at least one upright member whereby the frame can be adjusted to closely align with the back of the adult seat in front.

17. A fabric pouch for a child's safety seat, the pouch comprising:

a back, a bottom, a front and two leg openings;

adaptation to be releasably suspended from a framework; and means for securing the fabric pouch to an adult restraint of an adult seat, the adult seat being mounted to face forward on the floor of a vehicle, the framework being for supporting a child facing backwards towards the adult seat, and the framework being supported on the floor in front of the adult seat.

* * * * *

UNITED STATES PATENT AND TRADEMARK OFFICE
CERTIFICATE OF CORRECTION

PATENT NO.    : 6,402,241 B1
DATED         : June 11, 2002
INVENTOR(S)   : P. Mazzotti et al.

It is certified that error appears in the above-identified patent and that said Letters Patent is hereby corrected as shown below:

<u>Column 4,</u>
Line 24, "porch" should be -- pouch --.

Signed and Sealed this

Tenth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,402,241 B1
DATED : June 11, 2002
INVENTOR(S) : P. Mazzotti et al.

It is certified that error appears in the above-identified patent and that said Letters Patent is hereby corrected as shown below:

<u>Column 4,</u>
Line 24, "porch" should be -- pouch --.
Line 47, which is line 3 of claim 2, "its" should be -- said upright member's --.
Line 51, which is line 2 of claim 3, after "member" -- of the framework -- should be inserted.

This certificate supersedes Certificate of Correction issued December 10, 2002.

Signed and Sealed this

Fourth Day of February, 2003

JAMES E. ROGAN
*Director of the United States Patent and Trademark Office*